United States Patent
Komatsu

(10) Patent No.: US 7,697,064 B2
(45) Date of Patent: Apr. 13, 2010

(54) VIDEO SIGNAL PROCESSING APPARATUS AND VIDEO SIGNAL PROCESSING METHOD

(75) Inventor: Yoshikazu Komatsu, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 1156 days.

(21) Appl. No.: 11/298,520

(22) Filed: Dec. 12, 2005

(65) Prior Publication Data

US 2006/0132646 A1    Jun. 22, 2006

(30) Foreign Application Priority Data

Dec. 21, 2004  (JP) ............................. 2004-368758

(51) Int. Cl.
| | |
|---|---|
| H04N 11/20 | (2006.01) |
| H04N 7/00 | (2006.01) |
| H04N 7/01 | (2006.01) |
| H04N 9/45 | (2006.01) |
| H03L 7/00 | (2006.01) |

(52) U.S. Cl. ...................... 348/453; 348/457; 348/486; 348/505; 348/549

(58) Field of Classification Search ................. 348/453, 348/457, 486, 549, 505

See application file for complete search history.

(56) References Cited

U.S. PATENT DOCUMENTS

| | | | | |
|---|---|---|---|---|
| 4,476,484 A | * | 10/1984 | Haskell | 348/437.1 |
| 4,605,950 A | * | 8/1986 | Goldberg et al. | 348/389.1 |
| 4,622,578 A | * | 11/1986 | Rzeszewski | 348/487 |
| 4,918,515 A | * | 4/1990 | Faroudja | 348/433.1 |
| 5,006,926 A | * | 4/1991 | Tsinberg | 348/437.1 |
| 5,014,116 A | * | 5/1991 | Kawai | 348/436.1 |
| 5,021,870 A | * | 6/1991 | Motoe et al. | 348/451 |
| 5,282,019 A | * | 1/1994 | Basile et al. | 348/488 |
| 5,303,044 A | * | 4/1994 | Richards | 348/445 |
| 5,555,024 A | * | 9/1996 | Limberg | 348/473 |
| 5,579,056 A | * | 11/1996 | Chang | 348/555 |
| 5,583,575 A | * | 12/1996 | Arita et al. | 348/451 |
| 5,684,914 A | * | 11/1997 | Ban | 386/26 |
| 5,734,435 A | * | 3/1998 | Wilson et al. | 348/459 |
| 5,835,157 A | * | 11/1998 | Miyazaki et al. | 348/558 |
| 6,052,152 A | * | 4/2000 | Malcolm et al. | 348/537 |
| 6,157,739 A | * | 12/2000 | Yazawa et al. | 382/233 |
| 6,246,827 B1 | * | 6/2001 | Strolle et al. | 386/33 |
| 6,310,653 B1 | * | 10/2001 | Malcolm et al. | 348/537 |
| RE38,079 E | * | 4/2003 | Washino et al. | 348/722 |
| 6,690,430 B1 | * | 2/2004 | Takeshita | 348/638 |
| 6,751,256 B1 | * | 6/2004 | Nickel | 375/240.01 |

(Continued)

FOREIGN PATENT DOCUMENTS

JP    2004-208100    7/2004

*Primary Examiner*—Brian P Yenke
(74) *Attorney, Agent, or Firm*—McGinn IP Law Group, PLLC

(57) ABSTRACT

To provide a video signal processing apparatus capable of generating video signals that enable displaying and recording of a high-quality picture. A video signal processing apparatus according to an embodiment of the present invention includes a decoder decoding an input TS to generate a video signal having a field frequency fv of 60 Hz or a video signal having a field frequency fv of 59.94 Hz, and a converter converting the respective video signals into NTSC video signals having a color subcarrier the phase of which is inverted for each frame.

20 Claims, 10 Drawing Sheets

U.S. PATENT DOCUMENTS

| | | | |
|---|---|---|---|
| 7,092,042 B2 * | 8/2006 | Ikeguchi | 348/725 |
| 7,167,208 B2 * | 1/2007 | Park | 348/457 |
| 7,206,025 B2 * | 4/2007 | Choi | 348/441 |
| 2003/0223014 A1 * | 12/2003 | Kim | 348/505 |
| 2005/0012865 A1 * | 1/2005 | Kim et al. | 348/614 |
| 2006/0164554 A1 * | 7/2006 | Wang et al. | 348/607 |
| 2007/0041444 A1 * | 2/2007 | Gutierrez Novelo | 375/240.15 |

* cited by examiner

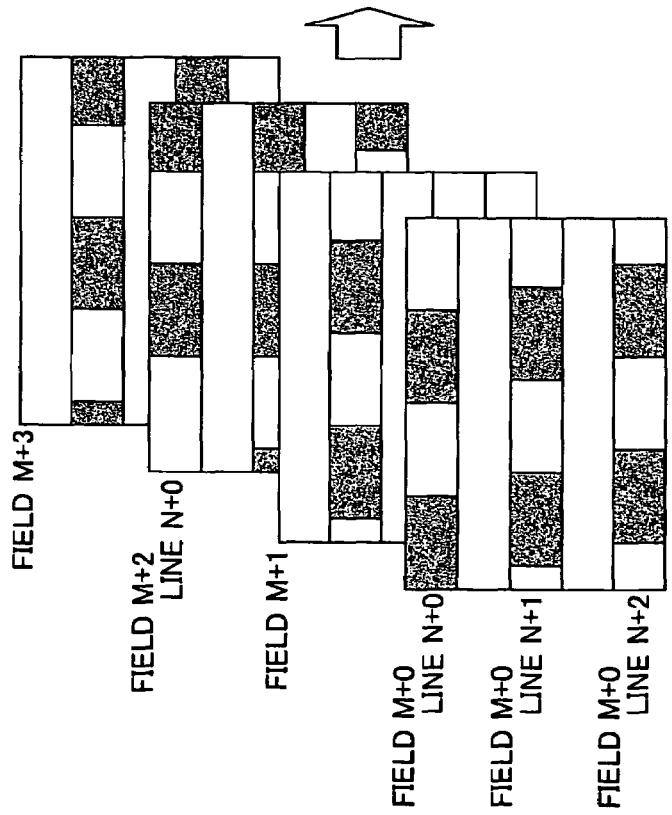
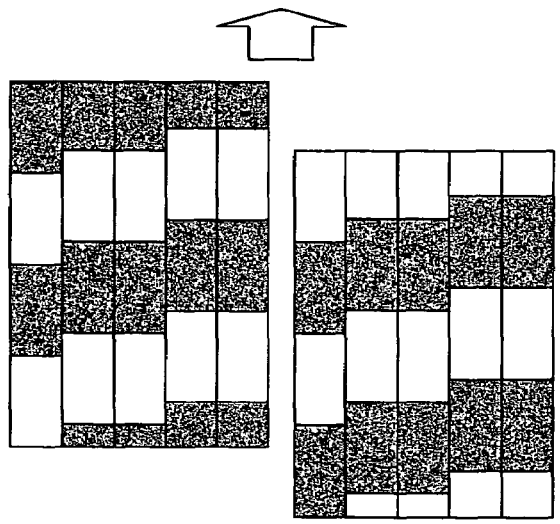
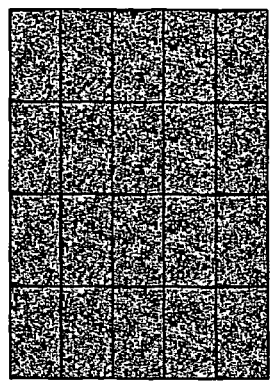
Fig. 6A
Fig. 6B
Fig. 6C

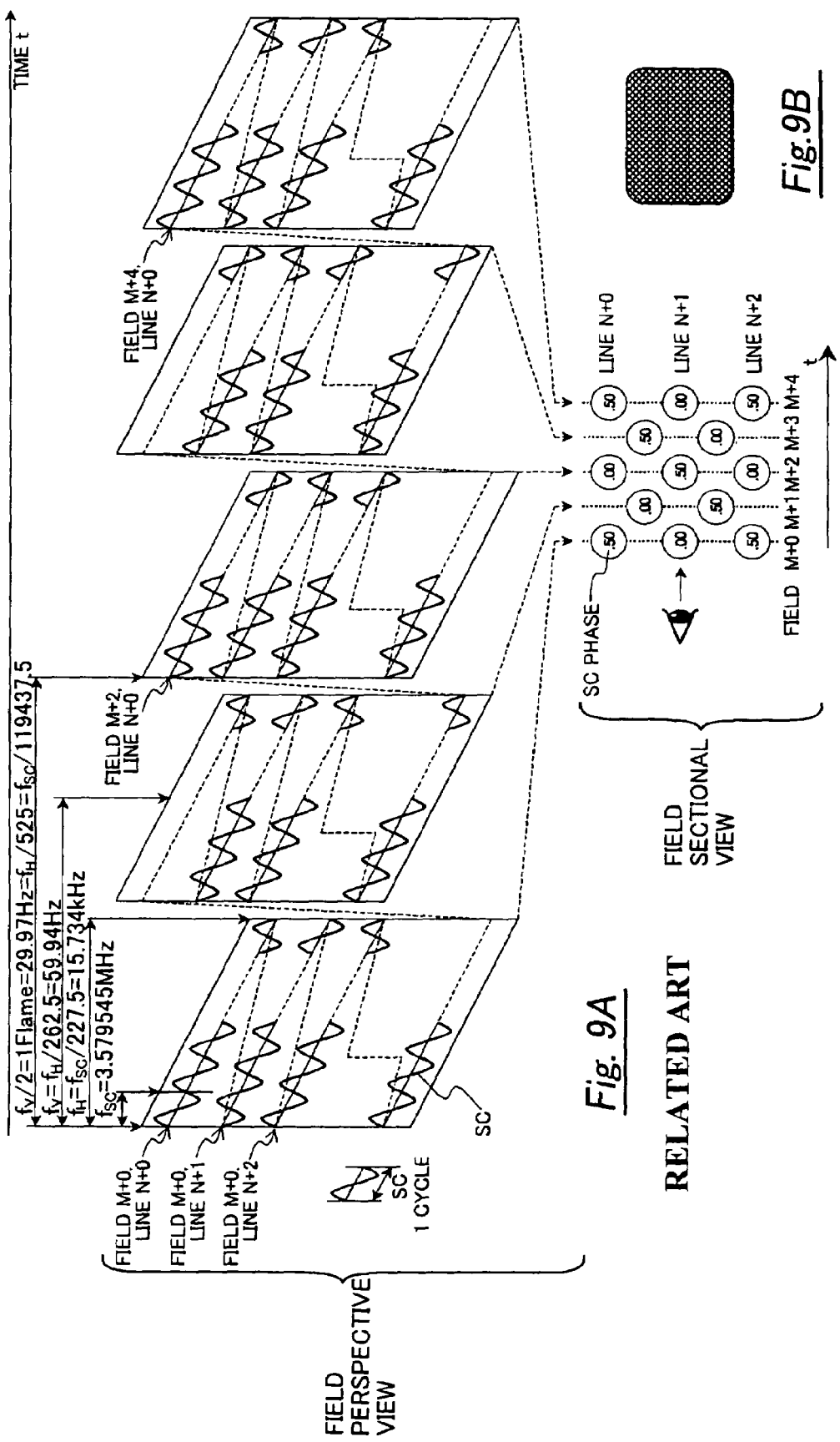

VIDEO SIGNAL PROCESSING APPARATUS AND VIDEO SIGNAL PROCESSING METHOD

BACKGROUND OF THE INVENTION

1. Field of the Invention

The present invention relates to a video signal processing apparatus and method, in particular, a video signal processing apparatus and method for converting plural input video signals to other video signals to output the converted signals.

2. Description of Related Art

In the past 50 years, an analog television broadcasting service has been provided in the USA via land broadcasts, cable, or other such media based on an NTSC (National Television Standards Committee) system.

A video signal based on the NTSC system is described. FIG. 7 shows a waveform of the video signal based on the NTSC system. This video signal includes a video signal component where a luminance signal (Y signal) and a chrominance signal (C signal) are multiplexed, a burst signal used as a reference for the chrominance signal, and a horizontal synchronizing signal for horizontal scanning, and is called a composite signal.

Further, this video signal has a frequency characteristic as shown in FIG. 8. The video signal is within a frequency band from 0 to fmax (maximum frequency), and a luminance signal falls within such a frequency band. The chrominance signal is modulated with a color subcarrier SC of a color subcarrier frequency fsc, and its frequency is within a frequency band spread from the color subcarrier frequency fsc by a predetermined value. This color subcarrier frequency fsc is also a frequency of the burst signal of FIG. 7. Considering the NTSC video signal, for example, fmax≈4.2 M Hz, and color subcarrier frequency fsc=3.579545 MHz.

A television receiver conforming to the NTSC system receives such a video signal, separates the video signal into a luminance signal and a chrominance signal (Y/C separation), and demodulates the chrominance signal (chroma demodulation) to display moving pictures. In general, the Y/C separating ability of the television receiver has a limit, so the separated Y signal components and C signal components involve crosstalk. In particular, the Y signal represents the luminance level, while the C signal is a signal demodulated with the color subcarrier SC (burst signal), the C signal causing crosstalk with the Y signal appears to be consecutive dot-like interfering wave (dot interference) in the human eyes. To that end, in the NTSC system, the following devises are made for the purpose of reducing the interference due to the crosstalk.

FIGS. 9A and 9B show a relation between a scanning line and a color subcarrier in an NTSC video signal. In the NTSC system, interlacing scanning is adopted to scan a frame as a single image which is divided into two fields. For example, first scanning displays even-numbered lines, and second scanning displays odd-numbered lines. One frame has 525 scanning lines, so one field has 262.5 scanning lines.

FIG. 9A is a field perspective view and sectional view showing a phase shift of a color subcarrier in each field based on the NTSC system, and the fields are arranged in order of display time. In FIG. 9A, 5 fields (M+0-4), that is, 2.5 frames are arranged in turn. In FIG. 9A, to focus the description on the phase shift of the color subcarrier SC, only the color subcarrier SC repeatedly appears. In practice, however, the waveform of FIG. 7 repeatedly appears depending on a color or luminance. As shown in FIG. 7, in the NTSC system, the phase of the color subcarrier SC is inverted every scanning in each field, and also inverted every frame. The phase inversion of the color subcarrier SC is described using various frequencies. Frequencies that are specified on the basis of standard NTSC system are represented by the following expressions (1) to (4).

Standard field frequency $fv$=60 Hz/1.001=59.94 Hz     (1)

Standard frame frequency $fv/2$=30 Hz/1.001=29.97 Hz     (2)

Standard line frequency fH=262.5 fv=15.734 kHz     (3)

Standard color subcarrier frequency fsc=227.5 fH=3.579545 MHz     (4)

The above expression (4) represents that the color subcarrier SC in one line has the frequency of 227 cycles+0.5 cycles (half-wavelength). That is, the color subcarrier SC of a target line is 0.5-cycle shifted from the color subcarrier SC of a subsequent line at the same position. Hence, the carriers of adjacent lines are 180° out of phase with each other. Such inter-line phase inversion is called "line interleaving".

Further, the standard color subcarrier frequency fsc and the field frequency fv have a relation of the following expression (5).

$$fsc = 2 \times 227.5 \times 262.5\, fv = 119437.5\, fv \quad (5)$$

The above expression (5) shows that a color subcarrier SC in one frame has a frequency of 119437 cycles+0.5 cycles (half-wavelength). That is, the color subcarrier SC shifts its phase by 0.5 cycles every frame, so the color subcarriers SC of adjacent frames are completely in opposite phase. Such inter-frame phase inversion is called "frame interleaving".

A field sectional view of FIG. 9A shows a phase shift of the color subcarrier SC at the far right of each field in the field perspective view of FIG. 9A. In FIG. 9A, encircled numbers indicate a phase shift from a phase of the color subcarrier SC in the field "M+0" on line "N+1" at the far left; this phase is used as a reference. Here, "0.00" denotes "in phase", i.e., no phase shift, and "0.50" denotes "in opposite phase", i.e., a phase shift of 0.5 cycles. As mentioned above, the color subcarrier SC inverts its phase between lines in a field and between frames.

FIG. 9B shows a screen display image as viewed from the observer's eye in the sectional view of FIG. 9A. If the color subcarriers SC of adjacent lines or frames are in phase without the line- or frame-interleaving, crosstalk components resulting from the Y/C separation look like a stripe pattern or fixed pattern on the screen, so an observer has a difficulty in viewing an image. However, as shown in FIG. 9B, owing to the phase shift of FIG. 9A, level differences (peaks and troughs) of the color subcarrier SC appear leveled. Hence, as shown in FIG. 9B, a screen display image in a given color is obtained.

Referring next to FIGS. 10A to 10C, the display image is described in more detail. FIG. 10A shows display images of the respective fields (M+0-3) of FIG. 9A. FIG. 10B shows display images of two frames each obtained by combining two of the fields of FIG. 10A. FIG. 10C shows a display image obtained by superimposing the two frames of FIG. 10B. For ease of explanation, the peaks and troughs of the color subcarrier SC are represented in black and in white, respectively.

As shown in FIG. 10A, the color subcarriers SC of adjacent lines in each field are in opposite phase due to line interleaving, so the white and black portions appear in different patterns between adjacent lines, and each white portion and each black portion of adjacent lines overlap together; neither the white portions nor the black portions overlap each other. That is, as shown in FIG. 10B, a checkered pattern is obtained.

As shown in FIG. 10B, in one frame obtained by superimposing two fields, a line of the next field is fitted in between the lines of the target field, and the white portions and the black portions alternately appear every two lines to form a checkered pattern. Further, owing to frame interleaving, each white portion and each black portion of adjacent frames overlap together; neither the white portions nor the black portions overlap each other.

By superimposing the two frames, as shown in FIG. 10C, the white portions and the black portions completely overlap to obtain a display screen in a given color with an averaged brightness. That is, if an observer checks on the television screen the color subcarrier SC that inverts its phase between frames, these color subcarrier SC components would be perceived as flicker components of 15 Hz. Owing to the human eyes' space charge effect, the light and dark portions appear to cancel out in the eyes of the observer and thus, the luminance difference is hardly perceived.

As mentioned above, the NTSC system adopts the color subcarrier frequency fsc such as is line- or frame-interleaved to minimize an influence of various interferences.

Meanwhile, in the USA, an ATSC (Advanced Television Systems Committee)-compliant digital television broadcasting service has started from November, 1998 as the next-generation television broadcasting system in parallel with the NTSC-compliant broadcasting service. This ATSC system features "high definition/wide screen", "high-quality sound", "low noise", "compatibility with various media", and other such characteristics of a digital broadcasting system. Table 1 shows a result of comparing the ATSC system and the NTSC system as below.

Further, the size of the conventional NTSC system and the HDTV size of the ATSC system are different image sizes and thus incompatible.

Here, the field frequency fv means the unit representing how many fields (picture materials) are transmitted (displayed) per second. In the ATSC system, as shown in Table 1, there are two types as the field frequency fv, that is, NTSC-compatible 59.94 Hz series (23.976 Hz, 19.97 Hz, and 59.94 Hz) and 60 Hz series (24 Hz, 30 Hz, and 60.00 Hz). Nowadays, the US television broadcasting services are based on the two types of field frequencies.

Now, a description is given of why the ATSC system defines two field frequencies fv of 59.94 Hz series and 60 Hz series. The 59.94 Hz series is defined in conformity with the conventional standard NTSC system, and this frequency is intended for compatibility with the NTSC system. With this series, existing NTSC-compliant contents/devices (accumulated asset) can be used as they are, and it is easy to exchange contents between the NTSC system and the ATSC system. During a period of transition of the broadcasting system from the NTSC system to the ATSC system, devices of the two systems would be used, so this is extremely efficient. The reason the field frequency fv is not set to just 60.00 Hz but to a little smaller value, 59.94 Hz is that at the start of NTSC color broadcasting, the frequency fv of the color subcarrier SC is delayed from the frequency of a sound signal at a ratio of 1000/1001 in order to prevent the interference between the sound signal and the color subcarrier SC.

The 60 Hz series is 1.001 times (1,000 ppm) higher than the field frequency fv of the standard NTSC system, and is suitable for global distribution of broadcasting materials albeit

TABLE 1

| Broadcasting system | Definition of resolution (image quality) | Details of definition | | Aspect ratio | Field frequency of transmission side material (i: interlacing p: progressive) | | | | Field frequency for operation |
|---|---|---|---|---|---|---|---|---|---|
| | | vertical (line) | horizontal (pixel) | | 59.94p/ 60p | 59.94i/ 60i | 29.97p/ 30p | 23.976p/ 24p | |
| ATSC (digital) | HDTV size | 1080 | 1920 | 16:9 | — | ○ | ○ | ○ | Both of 59.94 Hz and 60 Hz |
| | (high definition image quality) | 720 | 1280 | 16:9 | ○ | — | ○ | ○ | |
| | SDTV size (standard image quality) | 480 | 704 | 16:9 | ○ | ○ | ○ | ○ | |
| | | | | 4:3 | ○ | ○ | ○ | ○ | |
| | | | 640 | 4:3 | ○ | ○ | ○ | ○ | |
| NTSC (analog) | SDTV size (standard image quality) | 480 equivalent | 640 equivalent (analog) | 4:3 | — | ○ | — | — | Only 59.94 Hz |

○: existing system

As shown in Table 1, in the ATSC system, 18 display systems from an SDTV (Standard Definition TV: standard quality) to the new system, HDTV (High Definition TV: high quality) are set for the moving pictures in varying combinations of a resolution (1920×1080, 1280×720, 704×480, and 640×480), an aspect ratio (16:9, and 4:3), and a field frequency fv (24 Hz, 30 Hz, and 60Hz). In the NTSC system, only one image quality, standard image quality, is defined.

The HDTV size and the SDTV size of the ATSC system are used for different applications based on the policy of a broadcasting station, a recoding size (resolution) of picture contents, and a theme of a TV program. For example, the HDTV size is used for contents requiring a high image quality such as movies, while the SDTV size is used for conventional NTSC-based broadcasting or used for concurrently delivering plural contents on account of requiring only a small data amount.

sacrificing the compatibility with the standard NTSC system. The PAL system as an analog system adopted in Europe uses the field frequency fv of 50 Hz. As compared with a complicated field frequency fv ratio between NTSC system and PAL system (=59.94 Hz:50 Hz=1200:1001), the field frequency fv ratio between the ATSC system using the frequency of 60 Hz and the PAL system is as simple as 60 Hz:50 Hz=6:5. This facilitates the Europe-North America rate conversion. Further, it is said that the ATSC system using the frequency of 60 Hz is based on the fact the MUSE-compliant HDTV that has been developed in Japan prior to the ATSC system uses the frequency fv of 60 Hz, and its contents and devices can be easily applied. The ARIB system conforming to Japanese digital broadcasting standards is intended for the compatibility with the standard NTSC system, and standardizes the frequencies at 59.94 Hz series.

In this way, the ATSC broadcasting contents is distributed by selecting the HDTV size or SDTV size in accordance with its application and also setting the field frequency fv to 59.94 Hz or 60 Hz. For example, in the case where the content is distributed from the broadcasting station with the HDTV size, i.e., high resolution, a video signal decoded on the receiver side is accordingly based on the HDTV size. As mentioned above, the picture of the HDTV size is incompatible with the SDTV size of the conventional NTSC system. That is, unless the size is converted, it is impossible to input this video signal into a conventional NTSC television to view the picture or input a recording device (VCR/DVD recorder/HD recorder) to record the picture. Several years have elapsed from the start of the ATSC broadcasting service, and prices of an HDTV-ready TV monitor or HDTV recording device are coming down. Nevertheless, such devices are expensive, so the replacement of the device places great economical burden on a user. Therefore, in present developmental stages, it is desirable to enable the distribution of the ATSC broadcasting service to the user with little economical burden in consideration of the user's economical burden.

To that end, a video signal processing apparatus (set-top box) for converting the ATSC video signal received from the broadcasting station into the NTSC video signal has been widely used. As such a conventional video signal processing apparatus, there is known an apparatus disclosed in Japanese Unexamined Patent Publication No. 2004-208100.

FIG. 11 shows the configuration of a conventional video signal processing apparatus 900. The conventional video signal processing apparatus 900 converts an ATSC video signal input through an antenna 961 or a cable 962 into an NTSC video signal, and supplies the converted signal to an NTSC-compliant television receiver 970 or an NTSC-compliant recorder 980.

The conventional video signal processing apparatus 900 includes, as shown in FIG. 11, an ATSC decoder 910 for decoding an input transport stream (TS) into the ATSC video signal, a picture size converter 920 for converting an HDTV size into an SDTV size, an fv converter 930 for converting the 60 Hz-series field frequency fv to the 59.94 Hz-series field frequency fv, an NTSC encoder 940 for encoding the video signal of SDTV size into the NTSC video signal, and an fsc oscillator 950.

For example, if the input ATSC video signal has the field frequency of 60 Hz series, the picture size converter 920 converts the HDTV-size picture into an SDTV-size one, and the fv converter 930 converts the field frequency into 59.94 Hz. After that, the NTSC encoder 940 converts the video signal into the NTSC video signal based on the color subcarrier frequency fsc from the fsc oscillator 950.

If the input ATSC video signal has the field frequency of 59.94 Hz series, the picture size converter 920 converts the HDTV-size picture into an SDTV-size one, and the NTSC encoder 940 converts the ATSC video signal into the NTSC video signal based on the color subcarrier frequency fsc from the fsc oscillator 950 not through the fv converter 930.

However, the above conventional video signal processing apparatus 900 involves various drawbacks resulting from the provision of the fv converter 930. For example, the fv converter 930 stores the received image (field) into the fv converting buffer memory 931 and then converts the image into a desired field frequency fv to output the converted image, so a large memory capacity is required, which is uneconomical.

Further, the conversion ratio for the field frequency fv is as complicated as 60 Hz:59.94 Hz=1001:1000. This conversion based on the field frequency fv ratio means that one picture is removed from 1001 moving pictures to obtain 1000 moving pictures (referred to as "skipping"). The "skipping" takes place every 16.68 second, which value is calculated by converting 1001 to seconds (1001/60=16.68). As a result of "skipping", the continuity of moving images is lost every 16.68 seconds, resulting in unnatural images with a deteriorated quality. The resulting image quality is not an intended quality, so there is a fear about the collision with the portrait rights.

SUMMARY OF THE INVENTION

A video signal processing apparatus according to an aspect of the present invention includes: a decoder decoding an input video signal to generate a first standard video signal and a first non-standard video signal; and a converter converting the first standard video signal with a first color subcarrier frequency into a second standard video signal of which a color subcarrier inverts a phase for each frame, and converting the first non-standard video signal with a second color subcarrier frequency into a second non-standard video signal of which a color subcarrier inverts a phase for each frame. According to the apparatus of the invention, the color subcarrier needs only to satisfy a predetermined condition, making the field frequency conversion unnecessary. Consequently, a memory capacity necessary for the field frequency conversion can be reduced, and high image quality can be attained while preventing images from being skipped. Further, the color subcarrier inverts its phase every frame, whereby a luminance difference between frames is eliminated. Therefore, it is possible to minimize the occurrences of various interferences and further enhance the image quality.

A video signal processing method according to another aspect of the invention includes: decoding an input video signal to generate a first standard video signal and a first non-standard video signal; converting the first standard video signal with a first color subcarrier frequency into a second standard video signal of which a color subcarrier inverts a phase for each frame; and converting the first non-standard video signal with a second color subcarrier frequency into a second non-standard video signal of which a color subcarrier inverts a phase for each frame. According to the method of the invention, the color subcarrier needs only to satisfy a predetermined condition, making the field frequency conversion unnecessary. Consequently, a memory capacity necessary for the field frequency conversion can be reduced, and high image quality can be attained while preventing images from being skipped. Further, the color subcarrier inverts its phase every frame, whereby a luminance difference between frames is eliminated. Therefore, it is possible to minimize the occurrences of various interferences and further enhance the image quality.

A video signal processing apparatus according to still another aspect of the invention includes: an ATSC decoder decoding an input ATSC video signal; an NTSC encoder encoding the decoded signal with a color subcarrier frequency into an NTSC video signal; and a determining section determining the color subcarrier frequency in accordance with a field frequency of the ATSC video signal in such a manner that frames of the encoded NTSC video signal are interleaved. According to the apparatus of the invention, the color subcarrier needs only to satisfy a predetermined condition, making the field frequency conversion unnecessary. Consequently, a memory capacity necessary for the field frequency conversion can be reduced, and high image quality can be attained while preventing images from being skipped. Further, the color subcarrier inverts its phase every frame, whereby a luminance difference between frames is eliminated. Therefore, it is possible to minimize the occurrences of various interferences and further enhance the image quality.

BRIEF DESCRIPTION OF THE DRAWINGS

The above and other objects, advantages and features of the present invention will be more apparent from the following description taken in conjunction with the accompanying drawings, in which:

FIGS. 6A to 6C show a display image of a video signal of the video signal processing apparatus according to the embodiment of the present invention;

FIGS. 9A and 9B show a display image of a general NTSC video signal;

DESCRIPTION OF THE PREFERRED EMBODIMENTS

The invention will be now described herein with reference to illustrative embodiments.

Hereinafter, a video signal processing apparatus according to an embodiment of the present invention is described with reference to the accompanying drawings. A feature of the video signal processing apparatus according to this embodiment resides in a technique of converting an ATSC signal to an NTSC one by encoding the signal with an appropriate color subcarrier frequency fsc in accordance with a field frequency fv.

Figure 1:
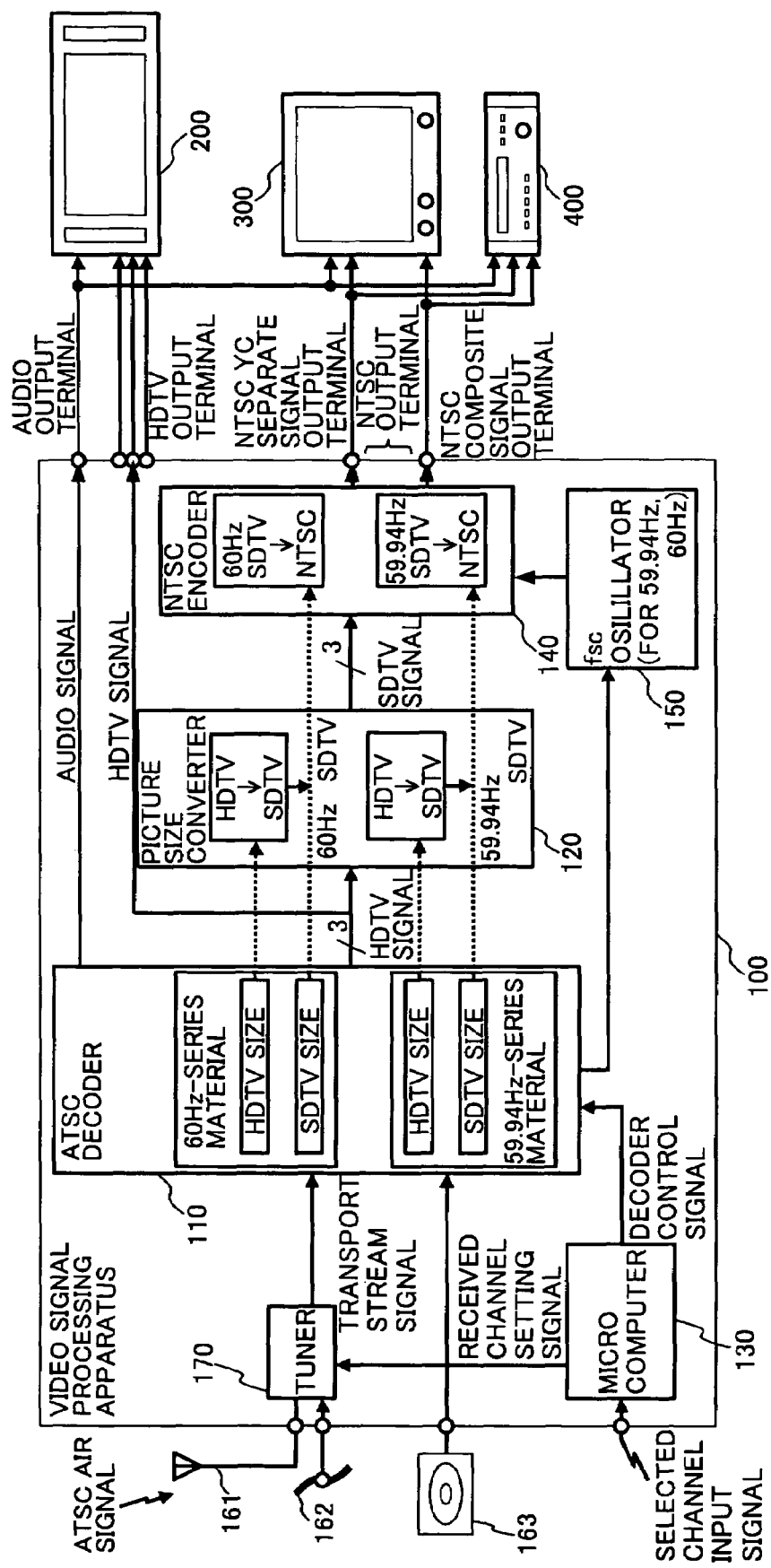
FIG. 1 is a block diagram showing the configuration of a video signal processing apparatus according to an embodiment of the present invention.

Referring first to FIG. 1, the configuration of the video signal processing apparatus according to this embodiment is described. A video signal processing apparatus 100 is, for example, a set-top box for converting a received ATSC video signal into an NTSC video signal. The video signal processing apparatus 100 converts a received signal into an NTSC one in accordance with its HDTV/SDTV size or field frequency. Hence, if high-definition signals of HDTV size are input, the apparatus can convert these signals into signals based on the existing NTSC system and output the converted signals, so a user's NTSC audio system/picture recording system can apply to these signals. Audiences have only to purchase such an optional ATSC set-top box alone for watching or recording an ATSC program.

The video signal processing apparatus 100 receives an ATSC signal through an antenna 161, a cable 162, a recording medium 163, etc. to convert the received signal to an NTSC video signal and output the converted signal to an NTSC television receiver 300 or an NTSC recording device 400. Further, the video signal processing apparatus 100 directly outputs decoded video signals to an HDTV television receiver 200.

The video signal processing apparatus 100 includes, as shown in FIG. 1, a tuner 170 receiving RF signals from an antenna 161 or a cable 162, an ATSC decoder 110 for decoding transport stream (TS) into ATSC video signals, a picture size converter 120 for converting an HDTV size into an SDTV size, a microcontroller 130 for switching a channel, an NTSC encoder 140 for encoding a video signal of SDTV size into an NTSC video signal, and an fsc oscillator 150 generating a signal having a color subcarrier frequency fsc of the NTSC signal.

For example, in a transmission system on the broadcasting station side, broadcasting contents (video/audio data) is compressive-encoded based on an MPEG system, and its payload is multiplexed in the form of transport stream (TS) together with time information or accompanying broadcasting data. The TS is modulated based on an 8VSB (air transmission) system, a QAM (cable transmission) system, or the like, and further modulated to the frequency band of the RF signal, and then transmitted by radio, cable, or other network transmitting systems.

The video signal processing apparatus 100 receives RF signals transmitted from a broadcasting station through the antenna 161 or the cable 162 to input the received signals to the tuner 170. For example, a user selects a channel of desired contents with a channel selector such as a remote controller or channel setting switch to input the selected channel to a selected channel input terminal.

The microcontroller 130 sets to the tuner 170 an RF signal band corresponding to the channel selected by a user. The tuner 170 extracts signals of the channel band from the preset RF signal band to subject the signals to RF demodulation, and then 8VSB or QAM demodulation, sending the resulting TS signal to the ATSC decoder 110.

The ATSC decoder 110 is, for example, an MPEG decoder for decoding the input TS signals into audio/video (A/V) signals. Specifically, the ATSC decoder 110 decodes the TS signal to generate a video signal (first standard video signal) having the field frequency fv of 59.94 Hz and a video signal (first non-standard video signal) having the field frequency fv of 60 Hz. The ATSC decoder 110 may receive the TS signal from either the tuner 170 or the recording medium 163 such as a DVD. The video signal processing apparatus 100 can output the decoded signal to both the HDTV-compliant apparatus and the NTSC-compliant apparatus.

The audio signals out of the decoded signals are output from an audio output terminal. The audio signals are commonly output to, for example, the HDTV television receiver 200, the NTSC television receiver 300, and the recording device 400.

The video signals out of the decoded signals are output to the HDTV-compliant apparatus and the NTSC-compliant apparatus through different routes. When supplied to the HDTV-compliant apparatus, the decoded HDTV signals are sent from the HDTV output terminal to the HDTV television receiver 200. The television receiver 200 can directly display the contents received on the basis of ATSC system.

When the video signals are supplied to the NTSC-compliant apparatus, the picture size is converted with the picture size converter 120. Further, the video signals are converted with the NTSC encoder 140 into the NTSC video signals and then output from the NTSC output terminal to the NTSC television receiver 300 or recording device 400. The NTSC capable television receiver 300 and recording device 400 can display and record the video contents received on the basis of ATSC system and then converted into the NTSC system.

The decoded video signals include a video signal having the field frequency fv of 60 Hz series and a video signal having the field frequency fv of 59.94 Hz, and a video signal having the HDTV picture size and a video signal having the SDTV picture size. The picture size converter 120 and the NTSC encoder 140 execute processings in accordance with the type of the video signal. The picture size converter 120 receives the video signal of HDTV size from the ATSC decoder 110 to convert the signal into the SDTV size applicable to the NTSC system. There are various resolution converting systems; the higher an image quality, the larger the hardware size. However, most of ATSC-compliant decoder products are originally endowed with a resolution converting function as an essential function. This is because signals with various levels of resolution are input to the decoder as mentioned above, but the decoder must be connected with a display device provided at a subsequent stage such as a panel display having a unique resolution. Therefore, the ATSC decoder 110 and the picture size converter 120 can be also implemented with a single decoder.

The NTSC encoder 140 is a converter for encoding the video signals converted to the SDTV resolution, that is, the video signal with the field frequency fv of 60 Hz series and the video signal with the field frequency fv of 59.94 Hz into the NTSC video signals. The picture size converter 120 executes the processing using baseband signals represented on the basis of luminance and color difference like Y/Cb/Cr or Y/U/V. The NTSC encoder 140 processes these signals to generate a Y signal superimposed with a synchronous signal, and a C signal quadrature-modulated with the color subcarrier SC, and output Y+C signal from the NTSC output terminal as a composite signal. Further, in this embodiment, an appropriate color subcarrier frequency fsc is selected in accordance with the field frequency fv of 59.94 Hz or 60 Hz prior to encoding. In other words, the NTSC encoder 140 converts the video signal having the field frequency fv of 59.94 Hz (first standard video signal) with a color subcarrier frequency specific to 59.94 Hz into the NTSC standard video signal (second standard video signal) where the phase of the color subcarrier is inverted for each frame, and converts the video signal (first non-standard video signal) having the field frequency fv of 60 Hz with a color subcarrier frequency fv specific to 60 Hz into an NTSC non-standard video signal (second non-standard video signal) where the phase of the color subcarrier is inverted for each frame. For example, the first standard video signal and the second standard video signal have the field frequency of 23.976 Hz, 29.97 Hz, or 59.94 Hz, and the first non-standard video signal and the second non-standard video signal have the field frequency of 24 Hz, 30 Hz, or 60.00 Hz.

Figure 2:
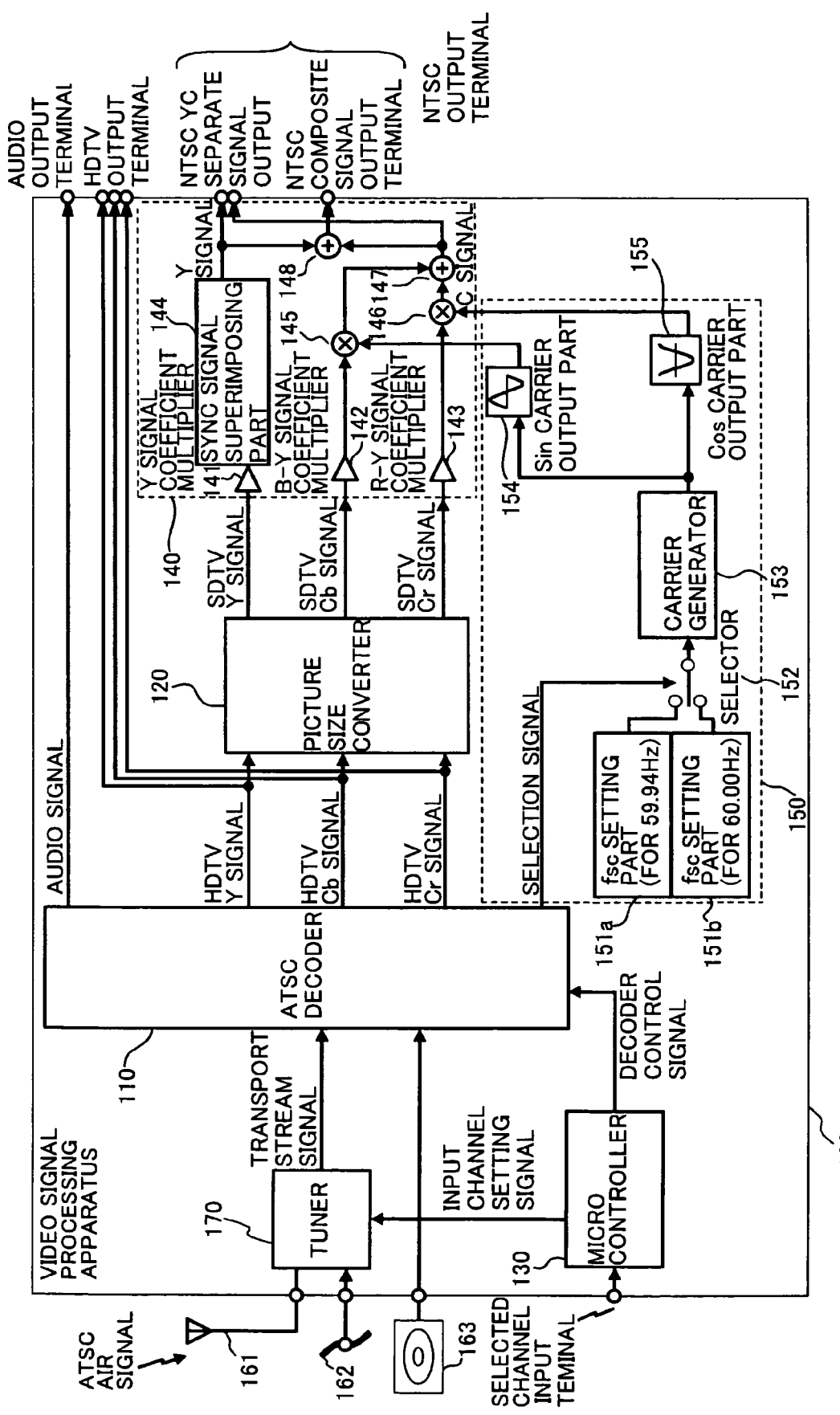
FIG. 2 is a block diagram showing the detailed configuration of the video signal processing apparatus according to the embodiment of the present invention.

Referring next to FIG. 2, the internal configuration of the NTSC encoder 140 and the fsc oscillator 150 is described.

The fsc oscillator 150 generates a Sin (sine) wave and Cos (cosine) wave of the color subcarrier frequency fsc based on the video signal, and the NTSC encoder 140 generates a Y signal representing a luminance and a synchronizing timing and subjects a color difference signal (U/V) representing a chroma saturation to quadrature-modulation with the color subcarrier SC into a C signal (C=Ucos(t)+Vsin(t)). Further, the NTSC encoder 140 adds the Y signal and the C signal to generate a composite signal (Y+C).

The NTSC encoder 140 includes, as shown in FIG. 2, a Y signal coefficient multiplier 141, a B-Y signal coefficient multiplier 142, an R-Y signal coefficient multiplier 143, a sync signal superimposing part 144, multipliers 145 and 146, and adders 147 and 148.

The fsc oscillator 150 includes, as shown in FIG. 2, fsc setting parts 151a and 151b, a selector 152, a carrier generator 153, a Sin carrier output part 154, and a Cos carrier output part 155.

The fsc setting part 151a sets a color subcarrier frequency fsc specific to the field frequency fv=59.94 Hz. The fsc setting part 151b sets a color subcarrier frequency fsc specific to the field frequency fv=60 Hz. In this embodiment, the color subcarrier frequency fsc is set as an appropriate value for each field frequency fv. Specific values of the color subcarrier frequency fsc are described later.

The ATSC decoder 110 detects the field frequency fv of the video signal from the input TS to output a selection signal for selecting the field frequency fv to the selector 152. The selector 152 selects the color subcarrier frequency fsc set by the fsc setting part 151a or 151b in accordance with the selection signal. The selector 152 selects the color subcarrier frequency fsc in accordance with the field frequency of the input TS. The selector 152 determines the color subcarrier frequency fsc in accordance with the field frequency of the input TS for the frames of the NTSC video signal encoded with the NTSC encoder 140 to be interleaved as described below. If the frame-interleaving relation is established between the frames, the display interference is suppressed.

The carrier generator 153 generates a signal wave of the color subcarrier frequency fsc selected with the selector 152, for example, a triangular wave. The Sin carrier output part 154 performs waveform shaping on the triangular wave signal generated with the carrier generator 153 into a Sin wave signal. The Cos carrier output part 155 performs the waveform shaping on the triangular wave signal generated with the carrier generator 153 into the Cos wave signal.

The ATSC decoder 110 outputs the Y signal, Cb signal, and Cr signal of HDTV size, and the picture size converter 120 converts the HDTV size into the SDTV size to generate the Y signal, Cb signal, and Cr signal of SDTV size. The Cb signal is B-Y signal, and the Cr signal is R-Y signal.

The sync signal superimposing part 144 multiplexes a sync signal with the Y signal input through the Y signal coefficient multiplier 141, and outputs the signal to a YC separate output terminal and the adder 148. The multiplier 145 multiplies the Cb signal received through the B-Y signal coefficient multiplier 142 by the Sin wave generated with the Sin carrier output part 154. The multiplier 146 multiplies the Cr signal received through the R-Y signal coefficient multiplier 143 by the Cos wave generated with the Cos carrier output part 155. The adder 147 adds components obtained by the multiplier 145 multiplying the Cb signal by Sin wave and components obtained by the multiplier 146 multiplying the Cr signal by the Cos wave to generate and output a C signal to the YC separate output terminal and the adder 148. The adder 148 adds the Y signal from the sync signal superimposing part 144 and the C signal from the adder 147 into a composite signal and outputs the composite signal from a composite signal output terminal.

Figure 3:
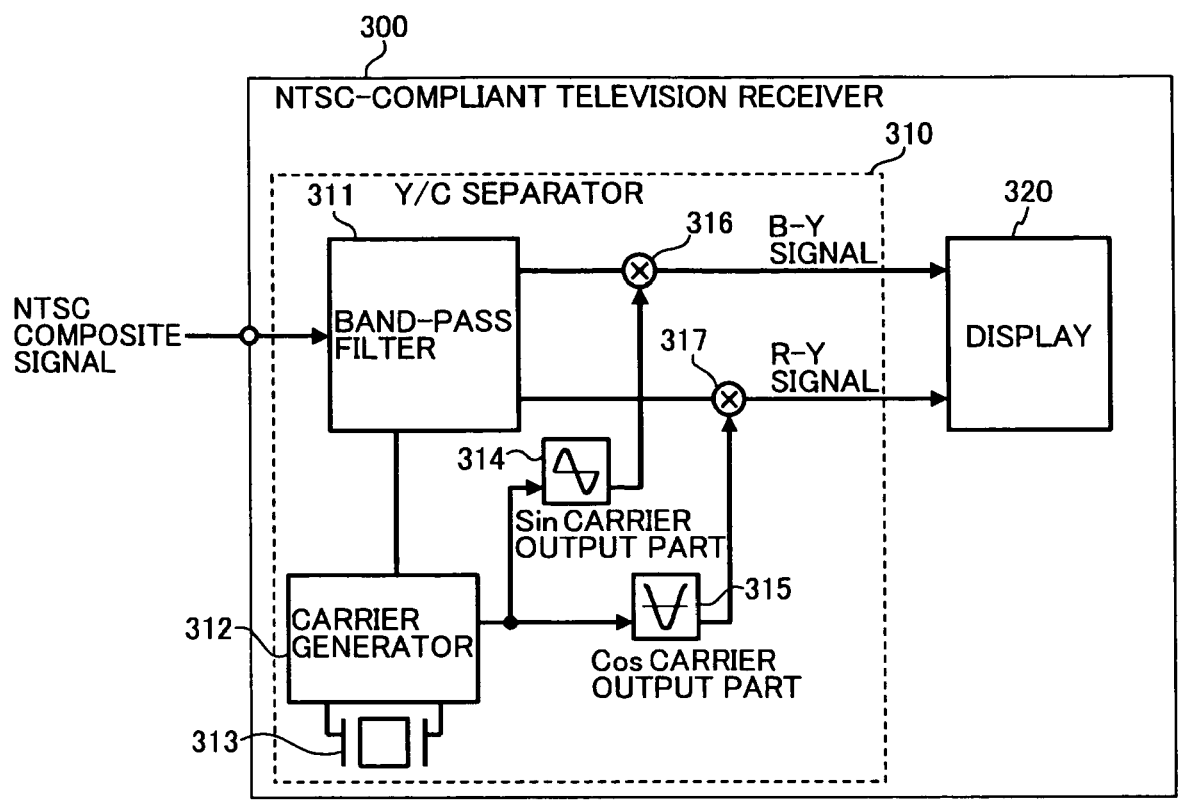
FIG. 3 is a block diagram showing the configuration of a television receiver connected with the video signal processing apparatus according to the embodiment of the present invention.

Referring next to FIG. 3, the configuration of the NTSC television receiver (audiovisual device) 300 connected with the video signal processing apparatus 100 is described. The television receiver 300 includes, as shown in FIG. 3, a Y/C separator 310 separating a composite signal into a Y signal and a C signal, and a display 320 displaying pictures on a screen based on a luminance signal or chrominance signal.

The Y/C separator 310 includes a band-pass filter 311, a carrier generator 312, a quartz oscillator 313, a Sin carrier output part 314, a Cos carrier output part 315, and multipliers 316 and 317.

When the video signal processing apparatus 100 inputs an NTSC composite signal to the receiver, signals of a predetermined frequency band pass through the band-pass filter 311.

The quartz oscillator 313 outputs signals of the color subcarrier frequency fsc. The carrier generator 312 generates a signal wave of the frequency of the quartz oscillator 313, for example, the triangular wave. For example, the carrier generator 312 has a phase locked loop (PLL) circuit, and the PLL circuit compares a burst signal from the band-pass filter 311 with the signal from the quartz oscillator 313 to generate an accurately synchronized triangular wave signal of the color subcarrier frequency fsc. The Sin carrier output part 314 performs the waveform shaping on the triangular wave signal generated with the carrier generator 312 into the Sin wave signal. The Cos carrier output part 315 performs the waveform shaping on the triangular wave signal generated with the carrier generator 312 into the Cos wave signal.

The multiplier 316 multiplies the signal passed through the band-pass filter 311 by the Sin wave from the Sin carrier output part 314 to generate and output a B-Y signal. The multiplier 317 multiplies the signal passed through the band-pass filter 311 with the Cos wave from the Cos carrier output part 315 to generate and output an R-Y signal. In other words, the Y/C separator 310 extracts from the composite signal the C signal multiplexed with the color subcarrier SC and subjects the C signal to quadrature demodulation to output a color difference signal. Although not shown, a filter is inserted between the multipliers 316 and 317 and the display 320. The B-Y signal and the R-Y signal are output through the filter. Further, although not shown, the Y/C separator 310 outputs a Y signal as well as the B-Y signal and the R-Y signal.

The display 320 displays pictures based on the B-Y signal and the R-Y signal output from the Y/C separator 310. The NTSC recording device 400 has the same configuration. In this case, the recording device 400 has a recorder in place of the display 320 and a Y/C separator similar to the Y/C separator 310.

Next, a description is given of a color subcarrier frequency fsc used in the video signal processing apparatus 100 for encoding, into the NTSC signal, that is, a color subcarrier frequency fsc preset with the fsc setting parts 151a and 151b. In this embodiment, an appropriate value of the color subcarrier frequency fsc is set based on the field frequency fv (60 Hz or 59.94 Hz) of the video signal prior to encoding.

In the case where the field frequency fv of the input video signal is 59.94 Hz, this frequency is a standard NTSC field frequency fv, so a standard NTSC frequency of 3.579545 MHz is selected. That is, the fsc setting part 151a sets this frequency. Hence, as shown in FIGS. 9A and 9B or FIGS. 10A to 10C, the color subcarrier frequency fsc is line-interleaved or frame-interleaved, preventing a display interference.

On the other hand, in the case where the field frequency fv of the input video signal is 60 Hz, this frequency is not a standard NTSC field frequency fv, any interference may occur.

Figures 4A, 4B:
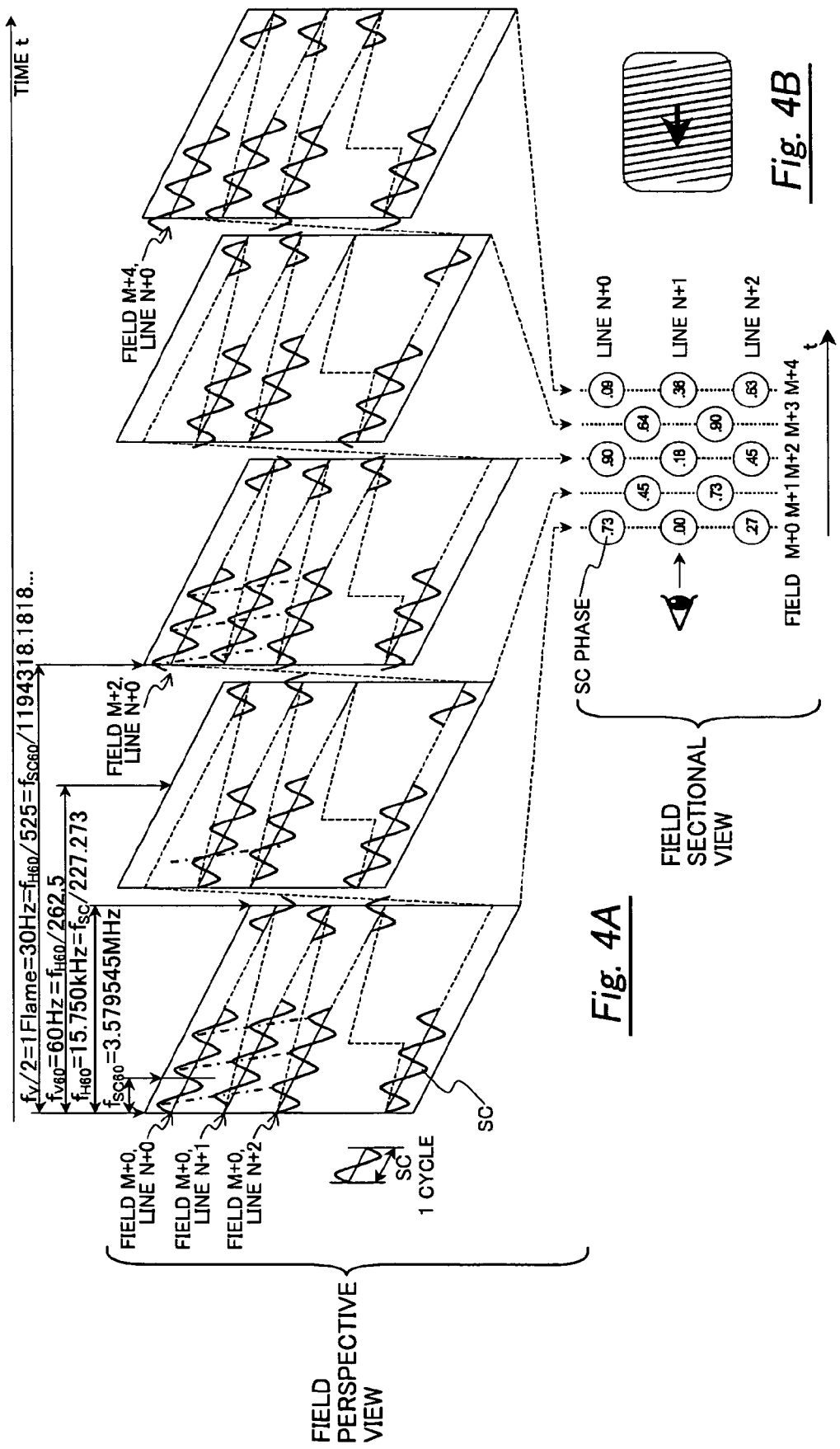
FIGS. 4A and 4B show a display image of a video signal of the video signal processing apparatus according to the embodiment of the present invention.

FIGS. 4A and 4B show the relation between a scanning line and the color subcarrier when the standard NTSC color subcarrier frequency fsc is applied to the video signal having the field frequency fv of 60 Hz. FIGS. 4A and 4B are similar to FIGS. 9A and 9B, showing 5 fields (M+0-4), that is, 2.5 frames that are arranged in turn. FIG. 4A is a field perspective view and sectional view showing a phase shift of the color subcarrier in each field. FIG. 4B shows a display image on a screen as viewed from observer's eyes in the field perspective view of FIG. 4A.

To mention each frequency in the illustrated example, the field frequency fv=60 Hz, the frame frequency fv/2=30 Hz, the line frequency fH=15.750 kHz, and the color subcarrier frequency fsc=3.579545 MHz.

In this case, the field frequency fv is set as a non-standard value, the relation between the color subcarrier frequency fsc and the field frequency fv (frame interleaving or line interleaving) as in the standard NTSC one is lost. The relation between the color subcarrier frequency fsc and the field frequency fv in this case is represented by the following expression (6)

$$fsc/f_{V60}=119437.5/1.001=119318.1818 \quad (6)$$

That is, the subcarrier SC in the frame has 119318 cycles+ 0.1818 cycles. As shown in FIG. 4A, the SC shifts its phase by 0.18 cycles between frames, so the frame-interleaved relation is not attained. Further, the phase is shifted by 0.27 cycles also between lines of each frame, so the line-interleaved relation is not attained.

Therefore, as shown in FIG. 4B, the positional differences of the peaks and troughs (light and dark patterns of the luminance signal) of the SC between the lines lead to a diagonal stripe pattern which seems to slide on the screen with time. In this example, the stripe pattern slides by 18% each per frame period. Therefore, this stripe becomes an interference, so a dot interference is more conspicuous rather than being minimized.

To that end, this embodiment sets such a frequency that even with the field frequency fv of 60 Hz, the frame-interleaved SC frequency (SC phase inverted between frames) can be attained like the standard NTSC frequency with a small deviation of the color subcarrier frequency fsc, and even if the SC causes crosstalk with the Y signal, an audience hardly perceives the crosstalk.

Hereinafter, specific conditions for determining the color subcarrier frequency fsc are described. In this embodiment, the color subcarrier frequency fsc is set to meet a condition that a frame-interleaving relation (first condition) is established and a condition (second condition) that the frequency falls within tolerance limits of the quartz oscillator 313 of the television receiver 300. As distinguished from the standard NTSC color subcarrier frequency fsc and field frequency fv, the color subcarrier frequency fsc and field frequency fv specific to 60 Hz are referred to as $f_{SC60}$, and $f_{V60}$, respectively.

Considering the condition for establishing the frame-interleaving relation between frames, the following expression (7) is derived.

$$f_{SC60}=(\text{integral value}+0.5) \times f_{V60} \quad (7)$$

The following expression (8) is derived from the above expression.

$$2f_{SC60}=\text{odd number} \times f_{V60} \quad (8)$$

Rearranging the expression (8) gives the following expression (9).

$$2f_{SC60}/f_{V60}=\text{odd number} \quad (9)$$

Put another way, the expression (9) shows that two frames include a given number (odd number) of SCs. The following expression (10) expresses the expression (9) with mod (m, n). The mod (m, n) represents a remainder of m divided by n.

$$\text{mode}(2 \times f_{SC60}/f_{V60}, 2)=1 \quad (10)$$

Since 2/fv is a frame frequency, the expression (10) shows that a value obtained by dividing the color subcarrier frequency $f_{SC60}$ by the frame frequency is further divided by 2 and the reminder equals 1. Substituting "$f_{V60}$=30 Hz" into the expression (10) gives the following expression (11).

$$\mod(f_{SC60}/30, 2)=1 \quad (11)$$

Therefore, the above expressions (10) and (11) correspond to the conditions for establishing the frame-interleaving relation with the field frequency fv=60 Hz.

Next, the conditions for setting the frequency within the tolerance limits of the quartz oscillator 313 of the television receiver 300 are discussed. A typical NTSC television receiver or recording device tolerates an error of the field frequency fv of the input signal. For example, during the FF/REW (fast forward/fast rewind) operation of a VCR device, the field frequency fv may shift by ±5 to ±10%, but the television receiver can process the signal without any problem. Thus, even if the field frequency fv is shifted from the standard frequency of 59.94 Hz to the non-standard frequency of 60 Hz (0.1% error=1,000 ppm), a problem never arises.

However, there is a tight tolerance for an error of the color subcarrier frequency fsc (=3.579545 MHz) for color image reproduction, and even an error of 1,000 ppm is disallowed. This is because, the television receiver generally adopts the quartz oscillator 313 for reproducing color information with accuracy as shown in FIG. 3. An error of the color subcarrier frequency fsc of the input signal should fall within, for example, the tolerance limits of ±100 ppm. Therefore, in this embodiment, the frequency sufficient for the Y/C separation with the Y/C separator 310 of the television receiver 300 is set as the frequency fsc. This frequency falls within the tolerance limits of the quartz oscillator 313 (±100 ppm). By adjusting an error of the color subcarrier frequency $f_{SC60}$ into 100 ppm or smaller in consideration of the ratio between the standard NTSC signal and the non-standard NTSC one, the following expression (12) is derived.

$$|1-f_{SC60}/fsc|<100\times10^{-6} \quad (12)$$

Here, since the color subcarrier frequency fsc is a standard NTSC frequency fsc of 3579545 Hz, this value is substituted into the expression (12) to derive the following expression (13).

$$|1-f_{SC60}/3579545|<100\times10^{-6} \quad (13)$$

Therefore, the above expressions (12) and (13) correspond to the conditions for setting the frequency within the tolerance limits of the quartz oscillator 313 of the television receiver 300. That is, from among the color subcarrier frequencies $f_{SC60}$ that meet the expression (11), the color subcarrier frequency $f_{SC60}$ within the range specified by the expression (13) should be selected.

TABLE 2

| $f_{SC60}$(Hz) | $2f_{SC60}/f_V$ | $\Delta f_{SC}$ |
|---|---|---|
| 3579555.0 | 119318.5 | +9.5 Hz, +2.7 ppm |
| 3579525.0 | 119317.5 | −20.5 Hz, −5.7 ppm |

Table 2 shows specific examples of the color subcarrier frequency $f_{SC60}$ similar to the standard color subcarrier frequency fsc, which meet the above expressions (11) and (13). In Table 2, Δfsc represents a difference from the standard color subcarrier frequency fsc. Thus, if such a value is set as the color subcarrier frequency fsc, no problem about display contents occurs even with the field frequency fv=60 Hz. In particular, the color subcarrier frequency $f_{SC60}$ is preferably set to a value close to the standard color subcarrier frequency fsc, that is, a value close to a center value of the allowable range (tolerance) of the quartz oscillator in consideration of an error or variation. That is, the absolute difference values of the color subcarrier frequency $f_{SC60}$ from the upper limit and the lower limit of the tolerance of the quartz oscillator are the maximum. Such a value is set in the fsc setting part 151b.

TABLE 3

| $f_{SC}$ (Hz) | $f_{SC}/f_H$ | $2f_{SC}/f_V$ | error (ppm) | |
|---|---|---|---|---|
| 3579165 | 227.2486 | 119305.5 | 106.2857 | |
| 3579195 | 227.2505 | 119306.5 | 97.90476 | |
| 3579225 | 227.2524 | 119307.5 | 89.52381 | |
| 3579255 | 227.2543 | 119308.5 | 81.14286 | |
| 3579285 | 227.2562 | 119309.5 | 72.7619 | |
| 3579315 | 227.2581 | 119310.5 | 64.38095 | |
| 3579345 | 227.26 | 119311.5 | 56 | |
| 3579375 | 227.2619 | 119312.5 | 47.61905 | |
| 3579405 | 227.2638 | 119313.5 | 39.2381 | |
| 3579435 | 227.2657 | 119314.5 | 30.85714 | |
| 3579465 | 227.2676 | 119315.5 | 22.47619 | |
| 3579495 | 227.2695 | 119316.5 | 14.09524 | ±100 ppm, |
| 3579525 | 227.2714 | 119317.5 | 5.714286 | |
| 3579555 | 227.2733 | 119318.5 | −2.66667 | |
| 3579585 | 227.2752 | 119319.5 | −11.0476 | |
| 3579615 | 227.2771 | 119320.5 | −19.4286 | |
| 3579645 | 227.279 | 119321.5 | −27.8095 | |
| 3579675 | 227.281 | 119322.5 | −36.1905 | |
| 3579705 | 227.2829 | 119323.5 | −44.5714 | |
| 3579735 | 227.2848 | 119324.5 | −52.9524 | |
| 3579765 | 227.2867 | 119325.5 | −61.3333 | |
| 3579795 | 227.2886 | 119326.5 | −69.7143 | |
| 3579825 | 227.2905 | 119327.5 | −78.0952 | |
| 3579855 | 227.2924 | 119328.5 | −86.4762 | |
| 3579885 | 227.2943 | 119329.5 | −94.8571 | |
| 3579915 | 227.2962 | 119330.5 | −103.238 | |

Table 3 shows an example of the color subcarrier frequency fsc within the tolerance limits of ±100 ppm of the quartz oscillator 313. Therefore, if a value selected from the table is set as the color subcarrier frequency fsc, no problem about display contents occurs similar to Table 2 even with the field frequency fv=60 Hz.

Figures 5A, 5B:
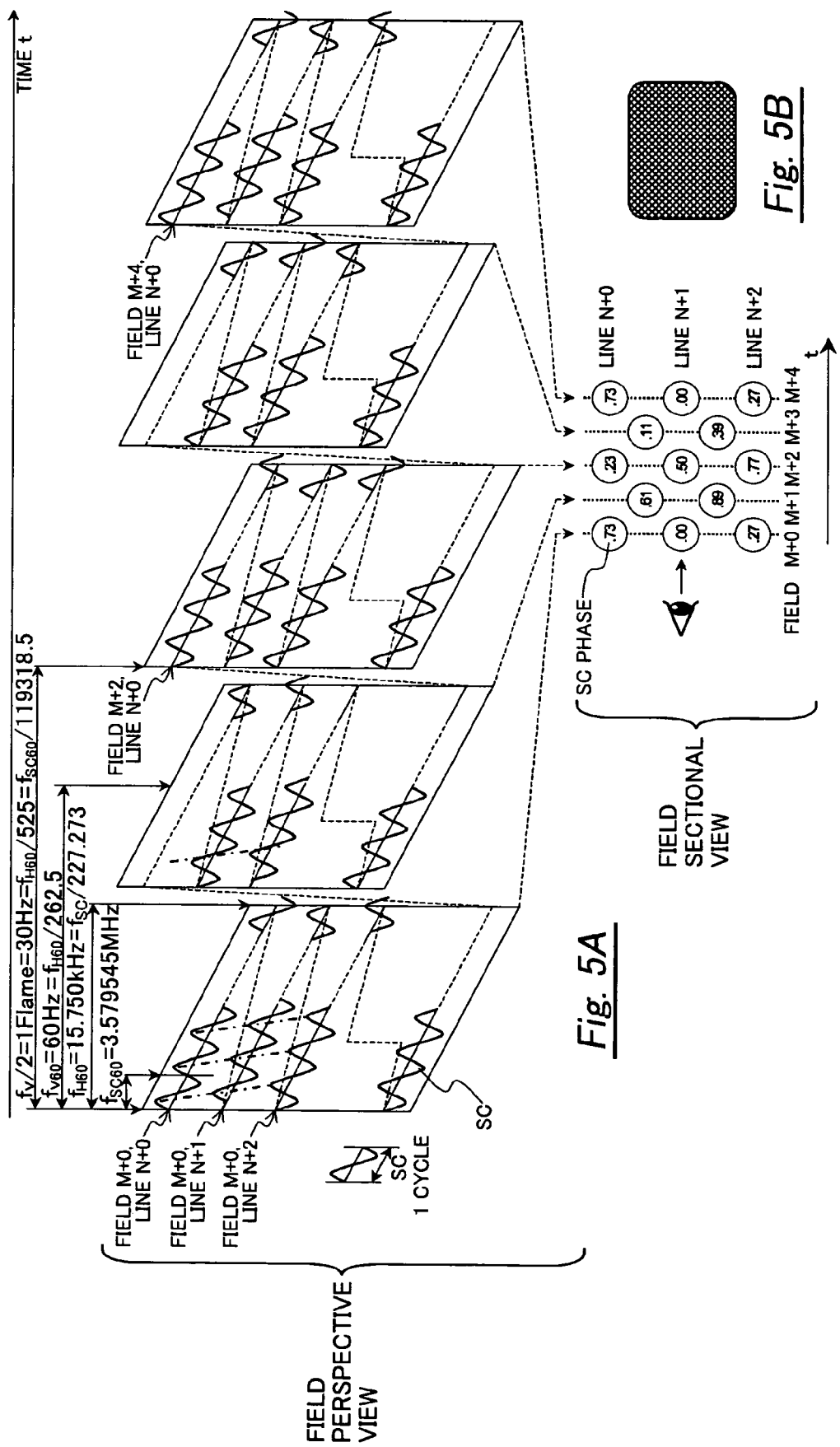
FIGS. 5A and 5B show a display image of a video signal of the video signal processing apparatus according to the embodiment of the present invention.
Figure 7:
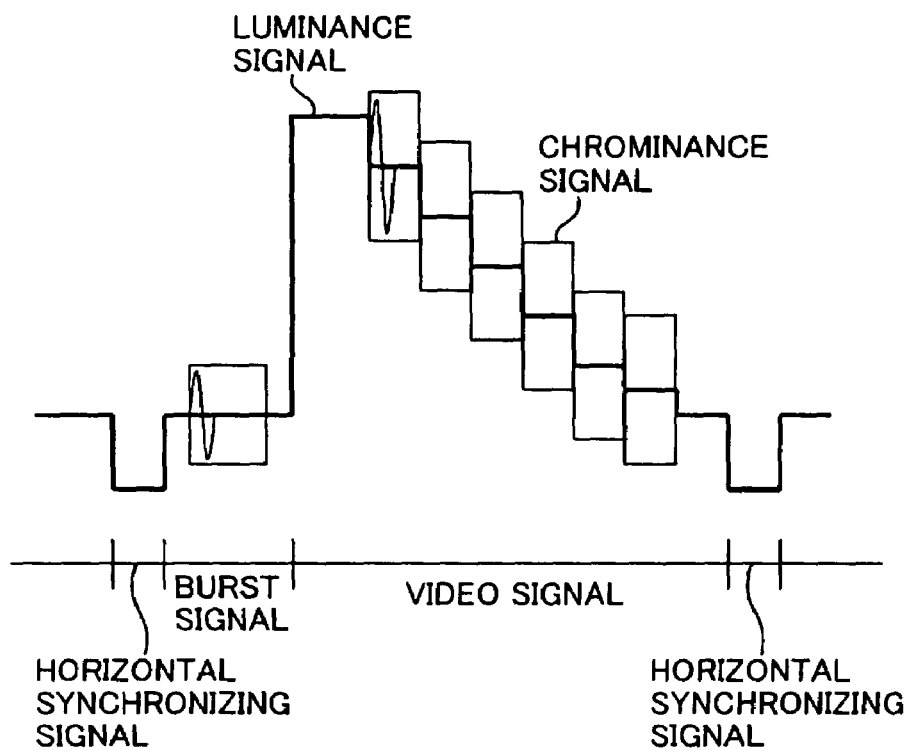
FIG. 7 is a waveform diagram of a general NTSC video signal.
Figure 8:
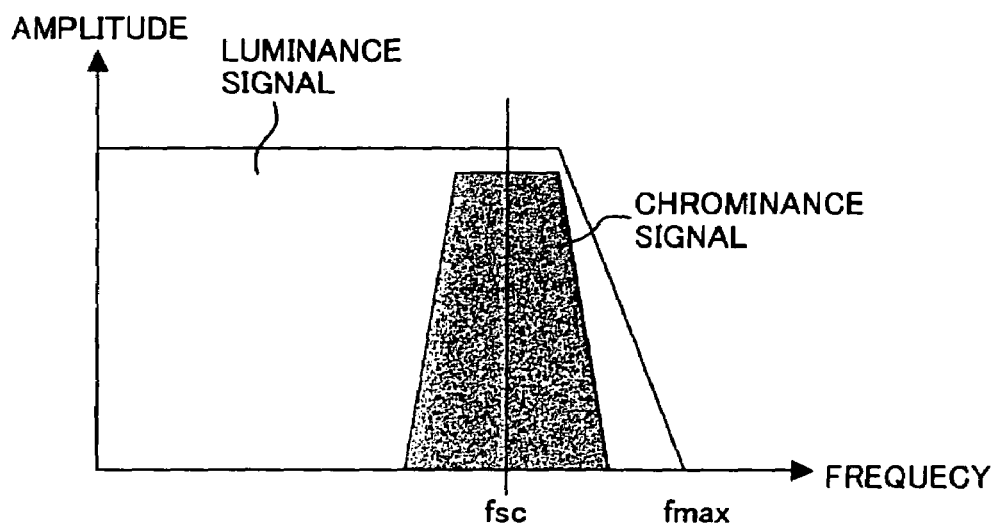
FIG. 8 shows frequency characteristics of a general NTSC video signal.
Figures 10A, 10B, 10C:
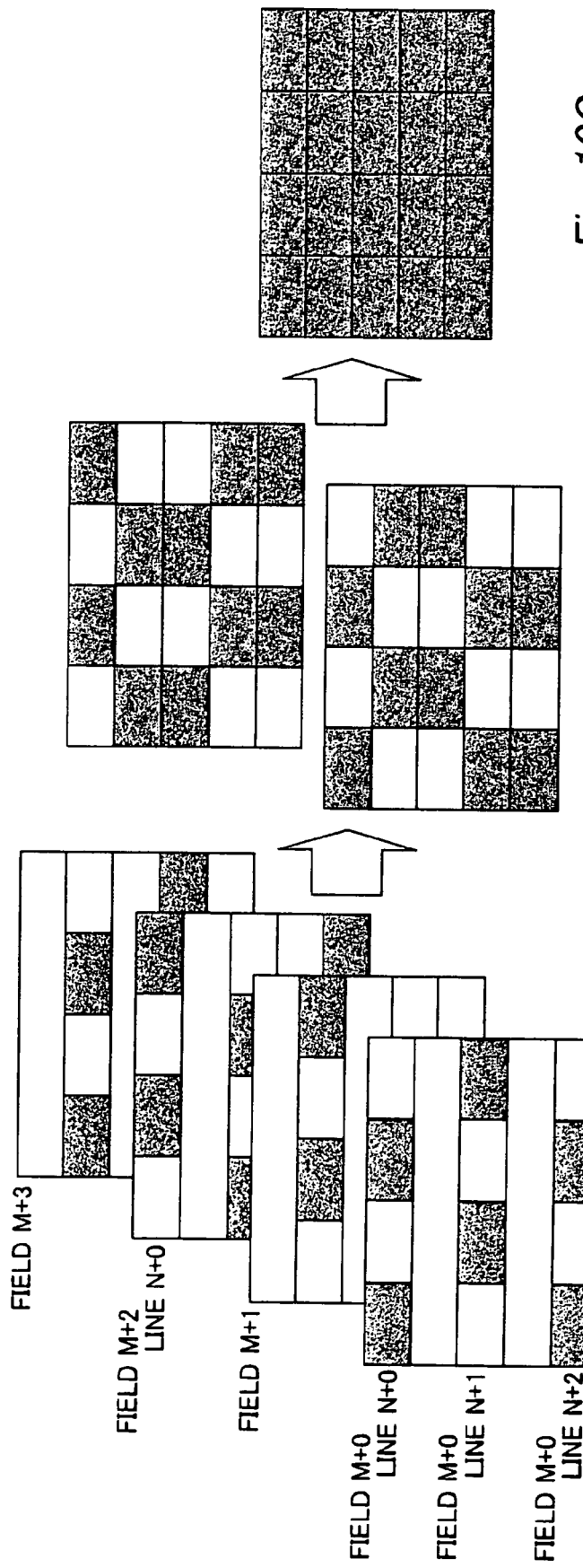
FIGS. 10A to 10C show a display image of a general NTSC video signal.

Next, a specific example of adopting the color subcarrier frequency fsc that meets the above condition is described. FIGS. 5A and 5B show a relationship between a scanning line and a color subcarrier in the video signal output from the video signal processing apparatus 100. FIGS. 5A and 5B are similar to FIGS. 9A and 9B, showing 5 fields (M+0-4), that is, 2.5 frames that are arranged in turn. FIG. 5A is a field perspective view and sectional view showing a phase shift of the color subcarrier in each field. FIG. 5B shows a display image on a screen as viewed from observer's eyes in the field perspective view of FIG. 5A.

In this example, the field frequency fv is 60 Hz, the frame frequency fv/2 is 30 Hz, the line frequency fH is 15.750 kHz, and the color subcarrier frequency fsc is 3.579555 MHz as shown in Table 2.

As shown in FIG. 5A, the phase is shifted between lines of each frame by 0.27 cycles each, so the line-interleaving relation is not established. However, the phase is shifted by 0.5 cycles between the frames and thus inverted. That is, the frame-interleaving relation is established.

As shown in FIG. 5B, the observation thereof reveals that the inter-frame phase inversion leads to the flicker as shown in FIG. 5A, and the ups and downs (peaks and troughs) of the color subcarrier SC are evened, in other words, the luminance is averaged due to human eyes' space charge effect. For example, an image displayed in a predetermined color is obtained as shown in FIG. 5B.

Further, referring to FIGS. 6A to 6C, the display image is described in more detail. FIG. 6A shows a display image of each of the fields (M+0-3) of FIG. 5A. FIG. 6B shows a display image of two frames each obtained by combining two of the fields of FIG. 6A. FIG. 6C shows a display image of a frame obtained by superimposing the two frames of FIG. 6B. Similar to FIGS. 10A to 10C, the peaks of the color subcarrier SC are represented in black, and the troughs of the color subcarrier SC are represented in white.

As shown in FIG. 6A, the phase is shifted by 0.27 cycles between lines of each field, so the black and white portions are shifted by the same cycles. That is, the white portions or the black portions overlap each other between adjacent lines by 0.73 cycles.

As shown in FIG. 6B, in one frame including two superimposed frames, a line of the next field is fitted in between the lines of the target field, every two lines correspond to each line of FIG. 6A. That is, the white and black portions are shifted every two lines by 0.27 cycles, and the white portions or the black portions overlap each other every two lines by 0.73 cycles. Further, the white portion and the black portion overlap each other between the adjacent frames due to the frame-interleaving; the portions of the same color do not overlap.

Then, by superimposing the two frames, the white and black portions overlap with each other completely, resulting in an averaged display in a predetermined color as shown in FIG. 6C. That is, the color subcarrier SC inverts its phase between the frames, so the luminance appears averaged similar to the standard NTSC system of FIGS. 10A to 10C, and the viewer hardly perceives the luminance difference. Therefore, even if the Y signal causes the crosstalk with the C signal due to the Y/C separation, this crosstalk is hardly perceived as an interference.

Figure 11:
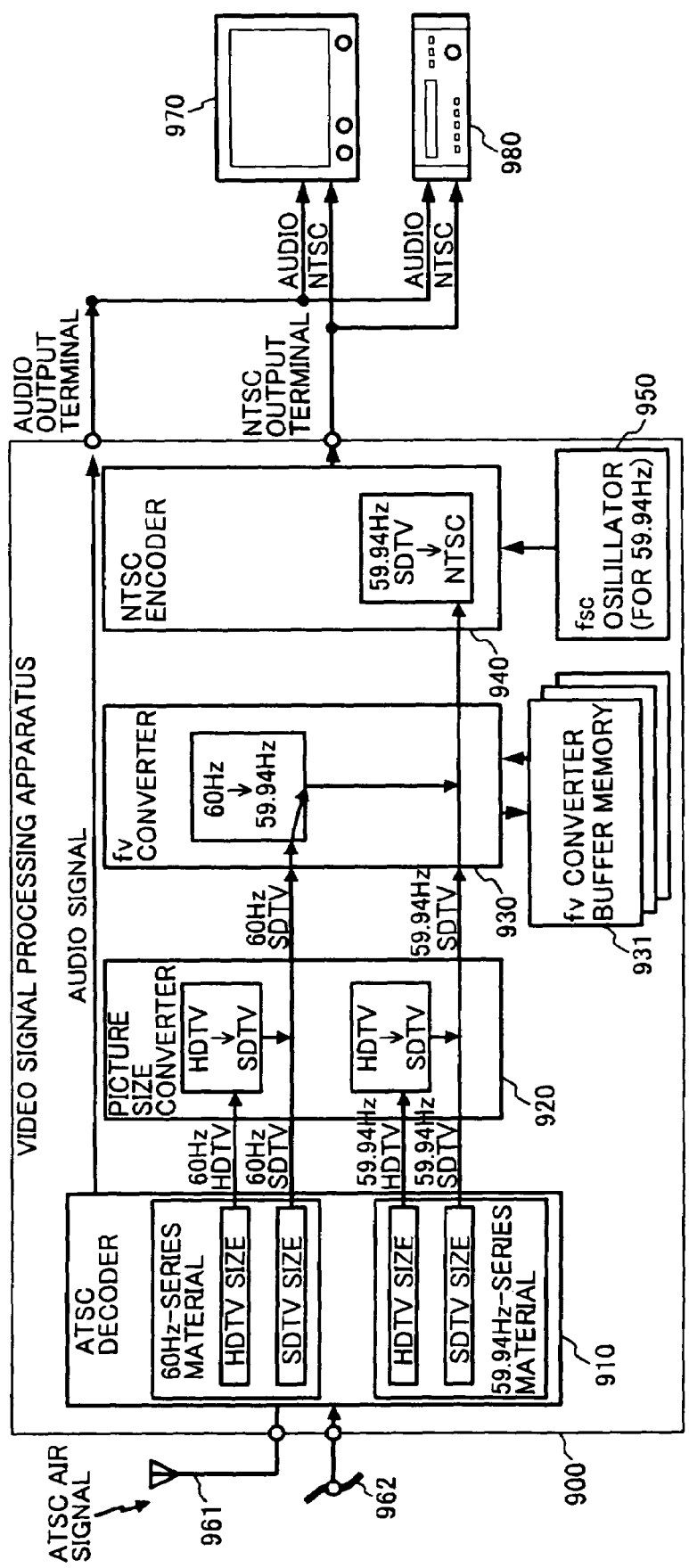
FIG. 11 is a block diagram showing the configuration of a conventional video signal processing apparatus.

As described above, in this embodiment, the apparatus for converting the ATSC video signal into the NTSC signal encodes the signal into the NTSC signal without using the converter for converting the field frequency fv like the related art of FIG. 11, so a large memory for converting the frequency is unnecessary and no problem arises in displaying moving pictures due to skipping of an image.

Further, in this embodiment, upon conversion into the NTSC signal, the color subcarrier frequency fsc suitable for the field frequency fv of the video signal is selected for encoding, whereby a receiver can display an image with high quality regardless of whether or not the field frequency fv is 59.94 Hz or 60 Hz.

In particular, with either field frequency fv, the color subcarrier frequency fsc is selected, by which the phase of the color subcarrier SC is inverted between frames. Hence, the carrier interference and dot interference can be minimized with accuracy to enhance the image quality. Further, a value of the color subcarrier frequency fsc is set to a frequency sufficient for the Y/C separation with the general NTSC receiver, so an existing receiver can display ATSC video contents with no problem.

The above embodiments describe the apparatus for converting the ATSC video signal into the NTSC video signal, but the present invention is not limited thereto, and may be applied to the other apparatus for converting a video signal It is apparent that the present invention is not limited to the above embodiment that may be modified and changed without departing from the scope and spirit of the invention.

What is claimed is:

1. A video signal processing apparatus, comprising:
a decoder decoding an input video signal to generate a first standard video signal and a first non-standard video signal; and
a converter converting the first standard video signal into a second standard video signal of which a color subcarrier inverts a phase for each frame by using a first color subcarrier frequency, and converting the first non-standard video signal into a second non-standard video signal of which a color subcarrier inverts a phase for each frame by using a second color subcarrier frequency.

2. The video signal processing apparatus according to claim 1, wherein two consecutive frames of the second standard video signal and the second non-standard video signal have an odd number of color subcarriers.

3. The video signal processing apparatus according to claim 1, wherein the second standard video signal and the second non-standard video signal are output to a separator for separating a multiplexed signal with an oscillator for generating a signal having a substantially same frequency as the first color subcarrier frequency, and the second color subcarrier frequency falls within tolerance limits of frequency of the signal generated by the oscillator for a difference from the first color subcarrier frequency.

4. The video signal processing apparatus according to claim 3, wherein absolute difference values of the second color subcarrier frequency from an upper limit and a lower limit of the tolerance are the maximum.

5. The video signal processing apparatus according to claim 1, further comprising a selector for selecting the first color subcarrier frequency or the second color subcarrier frequency as a frequency used for conversion by the converter in accordance with a field frequency of the first standard video signal or the first non-standard video signal.

6. The video signal processing apparatus according to claim 1, further comprising a picture size converter converting a picture size of the first standard video signal or the first non-standard video signal into a picture size of the second standard video signal or the second non-standard video signal.

7. The video signal processing apparatus according to claim 1, wherein the first standard video signal and the second standard video signal have a field frequency of 23.976 Hz, 29.97 Hz, or 59.94 Hz, and the first non-standard video signal and the second non-standard video signal have a field frequency of 24 Hz, 30 Hz, or 60.00 Hz.

8. The video signal processing apparatus according to claim 1, wherein the first standard video signal and the first non-standard video signal are ATSC video signals, and the second standard video signal and the second non-standard video signal are NTSC video signals.

9. The video signal processing apparatus of claim 1, wherein the color subcarrier of the second standard video signal inverts its phase between the frames of the second standard video signal, and
wherein the color subcarrier of the second non-standard video signal inverts its phase between the frames of the second non-standard video signal.

10. The video signal processing apparatus according to claim 1, wherein a frequency of the color subcarrier of the second standard video signal and a frequency of the color subcarrier of the second non-standard video signal are selected according to the phase of the color subcarriers of the second standard and non-standard video signal being inverted between the frames.

11. The video signal processing apparatus according to claim 1, wherein two consecutive frames of the second standard video signal include a predetermined number of color subcarriers according to a frequency of the color subcarrier of the second standard video signal and the first color subcarrier frequency of the first standard video signal, and wherein two consecutive frames of the second non-standard video signal include a predetermined number of color subcarriers according to a frequency of the color subcarrier of the second non-standard video signal and the second color subcarrier frequency of the first non-standard video signal.

12. The video signal processing apparatus according to claim 1, wherein the first standard video signal and the second standard video signal have a field frequency in a range of 23.976 Hz to 59.94 Hz, and the first non-standard video signal and the second non-standard video signal have a field frequency in a range of 24 Hz to 60.00 Hz.

13. The video signal processing apparatus according to claim 1, wherein a frequency of the color subcarrier of the second standard video signal and the second color subcarrier of the second non-standard video signal are set prior to converting by the converter according to substantially inverting the phase for each frame of the color subcarriers of the second standard and non-standard video signals.

14. A video signal processing method, comprising:
decoding an input video signal to generate a first standard video signal and a first non-standard video signal;
converting the first standard video signal into a second standard video signal of which a color subcarrier inverts a phase for each frame by using a first color subcarrier frequency; and
converting the first non-standard video signal into a second non-standard video signal of which a color subcarrier inverts a phase for each frame by using a second color subcarrier frequency.

15. The video signal processing method according to claim 14, wherein two consecutive frames of the second standard video signal and the second non-standard video signal have an odd number of color subcarriers.

16. The video signal processing method according to claim 14, wherein the second standard video signal and the second non-standard video signal are output to a separator for separating a multiplexed signal with an oscillator for generating a signal of the first color subcarrier frequency, and wherein the second color subcarrier frequency falls within a range of tolerance limits that the oscillator of the separator allows a difference from the first color subcarrier frequency.

17. A video signal processing apparatus, comprising:
an ATSC (Advanced Television Systems Committee) decoder decoding an input ATSC video signal;
an NTSC (National Television Standards Committee) encoder encoding the decoded ATSC video signal with a color subcarrier frequency into an NTSC video signal; and
a determining section determining the color subcarrier frequency in accordance with a field frequency of the ATSC video signal in such a manner that frames of the encoded NTSC video signal are interleaved.

18. The video signal processing apparatus according to claim 17, wherein the determined color subcarrier frequency is a frequency that satisfies a relational expression of: 2× color subcarrier frequency/field frequency=odd number.

19. The video signal processing apparatus according to claim 17, wherein the determined color subcarrier frequency falls within tolerance limits of a quartz oscillator used for Y/S separation of the encoded NTSC video signal.

20. The video signal processing apparatus according to claim 17, further comprising a picture size converter converting a picture size of the video signal decoded by the ATSC decoder into a picture size of the NTSC video signal,
wherein the NTSC encoder encodes the video signal the picture size of which is converted with the picture size converter into the NTSC video signal.

* * * * *